(12) United States Patent
Maun

(10) Patent No.: US 12,044,008 B2
(45) Date of Patent: Jul. 23, 2024

(54) BUILDING PANEL WITH SECTIONS

(71) Applicant: KNAUF GIPS KG, Iphofen (DE)

(72) Inventor: André Maun, Mülheim an der Ruhr (DE)

(73) Assignee: KNAUF GIPS KG, Iphofen (DE)

(*) Notice: Subject to any disclaimer, the term of this patent is extended or adjusted under 35 U.S.C. 154(b) by 179 days.

(21) Appl. No.: 17/414,813

(22) PCT Filed: Dec. 21, 2018

(86) PCT No.: PCT/EP2018/000580
§ 371 (c)(1),
(2) Date: Jun. 16, 2021

(87) PCT Pub. No.: WO2020/125919
PCT Pub. Date: Jun. 25, 2020

(65) Prior Publication Data
US 2022/0018128 A1 Jan. 20, 2022

(51) Int. Cl.
*B32B 13/14* (2006.01)
*B32B 13/02* (2006.01)
*E04C 2/04* (2006.01)
*E04C 2/06* (2006.01)

(52) U.S. Cl.
CPC ............... *E04C 2/06* (2013.01); *B32B 13/02* (2013.01); *B32B 13/14* (2013.01); *E04C 2/043* (2013.01); *B32B 2262/062* (2013.01); *B32B 2262/101* (2013.01); *B32B 2262/103* (2013.01); *B32B 2262/106* (2013.01); *B32B 2262/16* (2021.05); *B32B 2307/546* (2013.01); *B32B 2307/708* (2013.01); *B32B 2307/72* (2013.01); *B32B 2471/00* (2013.01); *B32B 2607/00* (2013.01)

(58) Field of Classification Search
None
See application file for complete search history.

(56) References Cited

U.S. PATENT DOCUMENTS

| 4,214,027 A | 7/1980 | Knauf et al. |
| 4,629,523 A | 12/1986 | Wetterwald et al. |
| 2015/0050443 A1* | 2/2015 | Roy ........................ E04C 2/246 428/114 |

FOREIGN PATENT DOCUMENTS

| EP | 2871056 A1 | 5/2015 |
| JP | H05230984 A | 9/1993 |
| JP | 2003062809 A | 3/2003 |

OTHER PUBLICATIONS

International Search Report and Written Opinion received for PCT/EP2018/000580, mailed Sep. 11, 2019.

* cited by examiner

*Primary Examiner* — Alexander S Thomas
(74) *Attorney, Agent, or Firm* — Greer, Burns & Crain, Ltd

(57) ABSTRACT

A building panel with a high degree of isotropy with regard to the load bearing capacity and flexural strength. The building panel includes a first section and a second section, each section including at least one layer, each of the at least one layer having fibers, whereby the fibers are distributed substantially homogeneously throughout each layer, substantially parallel to the main surfaces of the panel and oriented predominantly in the same direction and the sections are firmly joined in transverse direction, and the first section is thinner than the second section.

15 Claims, 4 Drawing Sheets

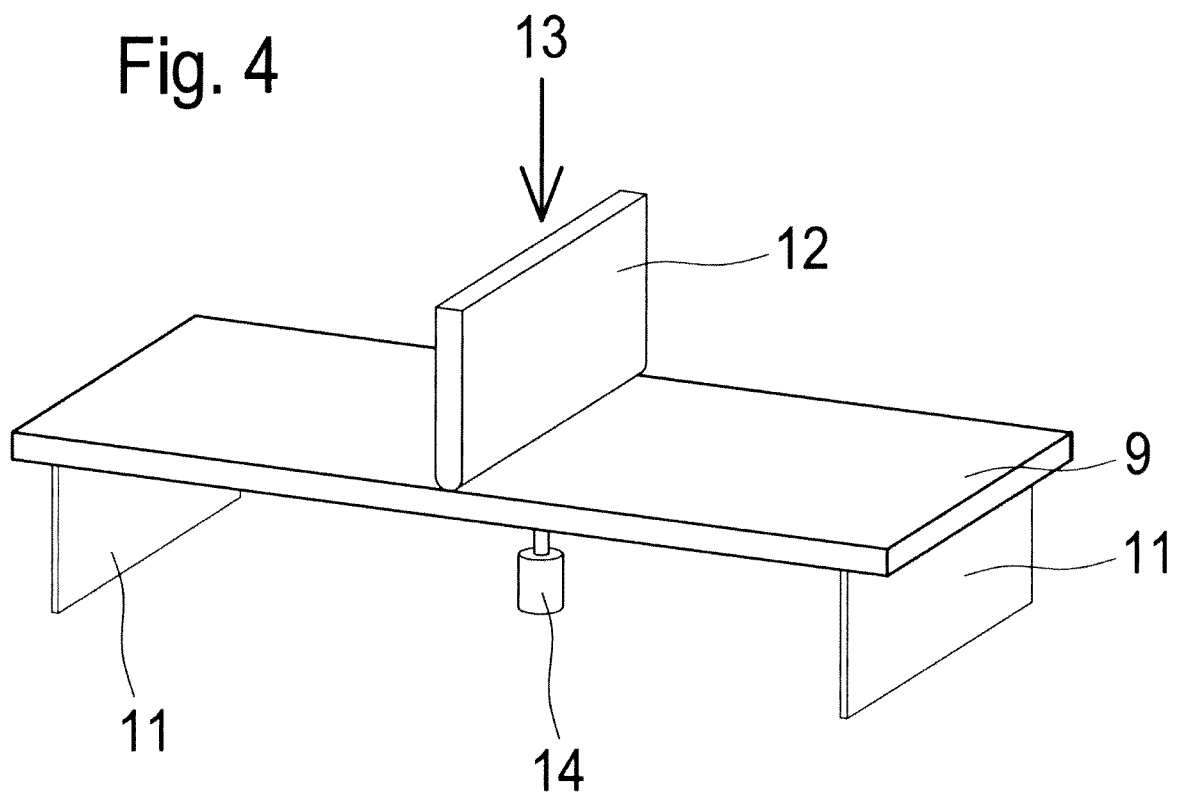

BUILDING PANEL WITH SECTIONS

BACKGROUND

Various types of fiberboards are used in construction, such as cementitious fiberboards or wood based fiberboards and engineered wood (e.g. oriented strand board OSB, high density fiberboard HDF, medium density fiberboard MDF or low density fiberboard LDF). All fiberboards have in common that fibers or flakes are distributed into a mat, frequently mixed with a binding material, e.g. a resin or a cementitious material, and subsequently compacted or pressed. Cementitious fiberboard, for example, is often produced by a wet process based on the Hatschek process comprising at least an endless production belt or moving web. The resulting building panels or boards can have distinct features, which can be attributed to the production method.

In the prior art, for example, there are processes that produce panels or boards in which the fibers are typically not oriented randomly, but are oriented in the direction of travel of the moving web and are thus predominantly aligned or oriented lengthwise in the machine direction. However, the panels mentioned above can be extremely anisotropic, i.e. they can have a low degree of isotropy, in terms of their mechanical strength. A panel can be considered isotropic, if the degree of isotropy equals 1. More specifically, the mechanical strength can be described in terms of e.g. the load bearing capacity or the flexural strength of a panel. Both the load bearing capacity as well as the flexural strength can be determined by the failure load of various areas on a panel (see e.g. EN 12825 (2001) and/or EN 15283-2 (2009) for details). The failure load can be tested by steadily increasing an applied force or load until the panel fails i.e. it breaks or cracks. In panels with a low degree of isotropy, the failure load differs with respect to the orientation of the panel in the test according EN 12825 (2001) and/or EN 15283-2 (2009).

The lowest failure load, i.e. the weakest area, often defines the mechanical strength of a panel. The weakest area can be located in the center of an edge (for the test according to EN 12825 (2001)) or the center line of a panel (for the test according to EN 15283-2 (2009)). For example, in flooring panels the lowest failure load can determine the panel's load bearing capacity. On the other hand, in ceiling panels and wall panels, the lowest flexural strength can correlate to the lowest break resistance of a panel.

Specific prior art (DE 2613976 C3) shows a process for producing gypsum fiberboard based on the Hatschek method in which at least two sections are superimposed and molded by pressure such that the direction of the predominant fiber orientation in each section deviates by about 90° from that in the superimposed sections. DE 2613976 C3 further claims an even number of sections in transverse direction result in increased and isotropic bending strength. This is disclosed for a panel with two sections of equal thickness.

However, tests with gypsum fiberboards have shown that, contrary to the disclosure of DE 2613976 C3, two sections of equal thickness that are joined in transverse direction result in a low degree of isotropy with regard to the load bearing capacity and flexural strength (Tables 1, 2 and 3). This low degree of isotropy is a disadvantage in building panels. Thus, for sufficient load bearing capacity, building panels used in floors, for example in raised access floors, to date generally require a thickness of 28 mm to 42 mm.

It can be seen that there remains a need to produce panels with a high degree of isotropy with regard to the load bearing capacity and flexural strength, which provide sufficient mechanical strength in all directions, independent of the thickness of the panel.

It is therefore the object of this invention to produce a building panel that has a high degree of isotropy with regard to the load bearing capacity and also with regard to the flexural strength. A further object of the invention is to produce a lighter building panel, which can also be produced more economically compared to those known to the art.

SUMMARY

This object is achieved by a building panel comprising a first section and a second section, each section comprising at least one layer, each of the at least one layer comprising fibers, whereby the fibers are distributed substantially homogeneously throughout each layer, substantially parallel to the main surfaces of the panel and oriented predominantly in the same direction and the sections are firmly joined in transverse direction characterized in that the first section is thinner than the second section.

The term building panel according to this invention refers to flat sheets used in construction to assemble walls, floors or ceilings. Examples of these building panels include, but are not limited to, wallboard, drywall, plasterboard, fiberboard, cementitious fiberboard, wood-based fiberboard and engineered wood.

The fibers in the inventive building panel are typically oriented in the direction of travel of the moving web during production and are thus oriented predominantly in the same direction. Preferably, they are aligned substantially lengthwise in the machine direction. Fibers generally have a slender, threadlike structure with a diameter that is smaller than the fiber's length, which makes an orientation distinguishable. The fibers may be substantially parallel to the main surfaces of the building panel, the main surfaces of the building panel being the top and bottom face of the building panel, together constituting at least 60% of the surface area of the building panel, preferably at least 70% of the surface area of the building panel. The fibers can be distributed substantially homogeneously throughout each layer. This is to be understood that they would appear to be distributed uniformly and not appear to be clumped or bunched in a portion of a layer.

The building panel can comprise two sections. Each section can consist of one or more layers. If a section comprises more than one layer, the fibers in all layers of one section are oriented predominantly in the same direction. According to this invention, the two sections are firmly joined in transverse direction. As a result, the fibers in one section will be oriented lengthwise in the machine direction, whereas the fibers in the other section will be oriented perpendicular or transverse to the machine direction, i.e. in across machine direction at an angle of approximately 90°. The transverse layers can be firmly joined by, for example, pressure or an adhesive or a combination thereof.

Fibers have the capacity to withstand force by elongation. This feature gives a building panel with fibers added mechanical strength, in particular in respect to the load bearing capacity and flexural strength. By joining two sections in a transverse direction, an applied force can be absorbed in two directions, giving the panel an even higher resistance to an applied force or load. Surprisingly, it could be shown, that this resistance to an applied force, such as those tested in EN 12825 (2001) or EN 15283-2 (2009), was even higher, if one section was thinner.

Without being bound by theory, it is believed that more than two sections, preferably of unequal thickness, could have a similar degree of isotropy, if superimposed sections are joined in transverse direction.

In a preferred building panel according to this invention, the first section is farthest from a force to be applied, e.g. a compressive force, as is the case in a floor panel. In an installed floor panel the first section may be below the second section. Surprisingly, the configuration of the sections can be irrelevant for the degree of isotropy in flexural strength. In building panels used as ceiling panels, which can deflect or sag, the first section can be either the top section or the bottom section. This may correspond to the front or back section in wall panels. The main difference compared to floor panels is that both ceiling and wall panels can frequently be disposed on parallel supports.

Preferably, the first section can make up at least 5%, preferably at least 10%, further preferably at least 12% of the thickness of the panel. It is also preferred that the first section can make up at most 30%, preferably at most 20%, further preferably at most 18% of the thickness of the panel. Wall panels and ceiling panels typically have an overall thickness or height of 6 mm to 13 mm, while floor panels typically have an overall thickness or height of 25 mm to 45 mm, preferably 28 mm to 42 mm.

In the building panel according to this invention, the second or thick section can have a thickness that is 2.5 to 10 times greater thickness compared to the first section, preferably a 4.5 to 6.5 times greater thickness compared to that of the first or thin section.

According to this invention, a section can comprise at least one layer. In the case of gypsum fiberboard, for example, this at least one layer can be produced by discharging a mixture onto a production belt or moving web, accumulating the mixture so in the form of a plurality of lamina on a roll and subsequently removing the layer e.g. in sheet-form from the roll. To obtain a section comprising a plurality of layers, the layers may be joined such that the fibers in all layers of one section are oriented predominantly in the same direction. It is possible to join the layers of a section and to join the respective sections in the same step.

The thickness of a layer can be controlled by the number of lamina accumulated on the roll. In the case of gypsum fiberboard, individual lamina may have a thickness of approximately one to two millimeters.

Single layers according to this invention are intended to serve physical parameters such as strength, load-bearing capacity, flexural and/or bending strength. They are thus considered non-decorative layers. Generally, layers are produced from the same mixture. However, it is possible to combine layers originating from different mixtures.

The joining of the sections in transverse direction is preferably performed such that the building panel may have a monolithic appearance, i.e. it may appear as a single unit without visible joints or seams. Preferably, this is achieved by joining the sections, preferably by pressure, before the binding material, such as the cementitious material, has set or hardened.

In one embodiment according to the invention, the building panel may comprise a binding material, e.g. a resin or a cementitious material. A cementitious material is a material that can set chemically, such as for example cement or stucco. Preferably, the cementitious material is a calcium sulfate material, further preferably a gypsum material. The building panel comprises at least 50% w/w cementitious material. In particular, the building panel can be a gypsum fiberboard or a cement fiberboard.

Fibers in building panels are generally used to reinforce the panels. These fibers can be of mineral, synthetic or biological origin, for example, cellulose fibers, glass fibers, composite fibers, carbon fibers, metal fibers, mineral fibers, synthetic fibers, nanofibers, fibers produced by biotechnological methods or genetic engineering or any combination thereof.

According to the invention the fibers can have a mean length of 1 mm to 5 mm, preferably 1 mm to 4 mm, further preferably 1 mm to 3 mm. According to the invention the fibers can have a mean diameter of 15 μm to 50 μm. The building panels can have a fiber content of 5% to 25%.

A building panel according to this invention may have a degree of isotropy greater than or equal to 0.83, preferably greater than or equal to 0.90, more preferably greater than or equal to 0.97 with regard to its load bearing capacity when determining the failure load according to EN 12825 (2001) with the first section being beneath the second section. Particularly in prior art cementitious fiberboards, the load bearing capacity can vary greatly for adjacent edges of a panel. This is mainly due to the preferred orientation of the fibers. In single section panels i.e. panels with a relative thickness of 100%/0% of top to bottom layer as in Table 2, the edge that is substantially parallel to the lengthwise orientation of the fibers generally exhibits a higher load bearing capacity compared to the edge that cuts fibers in their cross-section.

A building panel according to this invention may have a high degree of isotropy with regard to its load bearing capacity. Sampling spots are chosen in the center of adjacent edges of a panel according to EN 12825 (2001), because the center is typically the weakest spot of an edge. To determine the degree of isotropy, the relative failure load i.e. the ratio of the failure load of the weak edge to the failure load of the adjacent strong edge is determined. A value of 1 indicates isotropy with regard to the load bearing capacity. By joining a first or thin section and a second or thick section in transverse direction, the failure load of adjacent edges approaches similar values such that the building panel's load bearing capacity nears isotropy. However, this isotropy is one directional, which means that the first section has to be the bottommost section in the test according to EN 12825 (2001), ideally also in the installed panel. In fact, the degree of isotropy decreases, if the first section is the topmost section in the test or an installed floor panel.

A building panel according to this invention may have a degree of isotropy greater than or equal to 0.88, preferably greater than or equal to 0.93 with regard to the flexural strength when determining the flexural strength according to EN 15283-2 (2009). Transverse and longitudinal specimens sized 550 mm×300 mm are cut from a panel for this test. The degree of isotropy is determined by relating the flexural strength, determined with the force that incurs fracture, of longitudinal specimen to the transverse specimen of a panel. A degree of isotropy 1 is considered isotropic. To determine the degree of isotropy, the smaller value, i.e. the lower flexural strength, is always divided by the larger value, i.e. the greater flexural strength.

It is expected that an optimum for the relative thickness of the first section to the second section exists. It is further expected, that the degree of isotropy with regard to the load bearing capacity as well as the flexural strength will decrease, if the first section is too thin.

A building panel according to the invention may have a density greater than 1200 kg/m$^3$ and less than 2000 kg/m$^3$, preferably greater than 1400 kg/m³ and less than 1800 kg/m³, further preferably greater than 1500 kg/m³ and less than 1700 kg/m³.

Separate protection is also sought for a method to produce a building panel comprising the steps of providing a first section and a second section, each section comprising at least one layer, each of the at least one layers comprising fibers and firmly joining the first section and the second section in transverse direction, wherein the first section is thinner than the second section.

Advantageously, the fibers in the aforementioned method are distributed substantially homogeneously throughout each layer, substantially parallel to the main surfaces of the panel and oriented predominantly in the same direction.

The method according to according to this invention may further comprise
  mixing the fibers and other constituents to form a mixture
  discharging the mixture onto a moving web,
  accumulating a plurality of lamina on a roll to form a layer and/or
  removing at least one layer from the roll.

In a method according to this invention, which can partially be based on the Hatschek process, fibers in the form of pulp can be mixed with other constituents. The pulp can typically be prepared from recycled paper and/or cardboard, which usually comprise approximately 80% cellulose.

In a preferred method according to this invention, the other constituents can comprise a binding material and/or additives, whereas the additives can comprise, but are not limited to retarders, flocculants, dispersing agents. The binding material may comprise a cementitious material or resin. A cementitious material is a material that can set chemically, such as for example cement or stucco. Preferably, the cementitious material is a calcium sulfate material, further preferably a gypsum material. The cementitious material may further include carbonates and/or silicates.

The mixture thus obtained can then be discharged, preferably discharged continuously, onto a moving web or production belt. Preferably, the moving web can run at a speed of 50 m/min to 150 m/min, preferably at a speed of 70 m/min to 120 m/min. An endless mat of the mixture can be accumulated on a roll in the form of several lamina. After reaching sufficient thickness, a multi-layer lamina-sheet, can be removed from the roll by cutting. This multi-layer sheet can comprise a layer. It is advantageous, if the process includes the option of adjusting the production line to manufacture layers and/or sections of varying thickness. After at least two sections comprising at least one layer each are superimposed in transverse direction, the sections can be compacted in a press before the mixture has set and/or hardened. The dewatering of the mixture and also the layers and/or sections can take place on the moving web, on the roll and in the compaction press. The resulting sheet-like panel can further be cut into smaller panels and finally left to set, harden and/or dry. The resulting sheet-like panel can be a contiguous, solid panel with monolithic appearance.

Separate protection is also sought for the use of a building panel according to the invention as floor panel, ceiling panel or wall panel, preferably as raised access floor panel. Furthermore, panels used as projectile resistant drywall, wall panels subjected to soft body impacts, flooring elements, prefabricated screed panels and/or ceiling panels could benefit from an increase in the degree of isotropy. In ceiling panels, the degree of sagging, especially in humid environments, could be also reduced.

The invention is explained further in the figures. However, the examples in the figures do not limit the scope of the invention.

BRIEF DESCRIPTION OF THE DRAWINGS

FIG. 4: Schematic representation of the set-up to test the flexural strength of a panel according to EN 15283-2 (2009).

DETAILED DESCRIPTION

Figure 1:
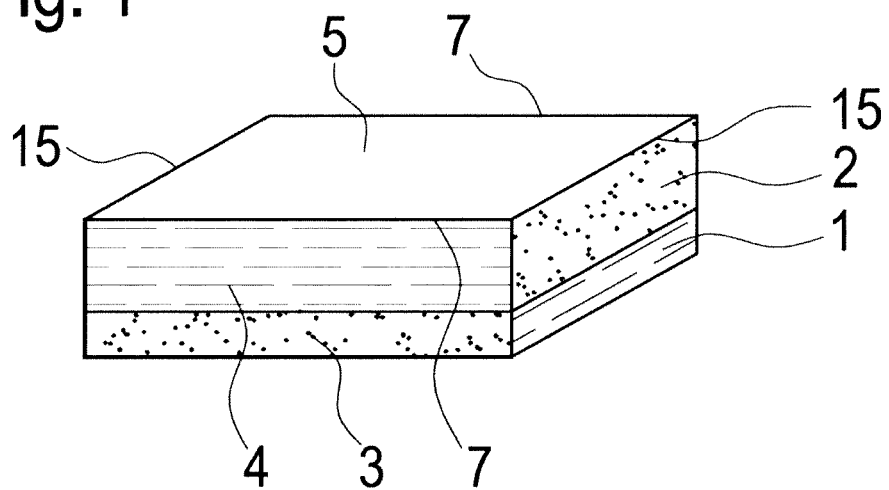
FIG. 1: Schematic representation of a building panel according to the invention.

Reference Number 1 first section
2 second section
3 fiber in cross section
4 fiber in longitudinal section
5 top main surface
6 layer
7 edge
8 steel cylinder
9 specimen
10 indentor
11 parallel support
12 platen
13 direction of applied force
14 sensor measuring deflection
15 adjacent edge FIG. 1 depicts a panel with two sections, whereby the first section 1 is thinner than the second section 2. In this embodiment each section 1 and 2 consists of one layer 6. The fibers of the first section are cut in cross section 3, while the fibers of the second section are cut in the longitudinal section 4, as can be seen below edge 7. This is reversed below the adjacent edge 15. The panel has two main surfaces. Here, the top main surface 5 is shown and the bottom main surface is hidden.

Figure 2:
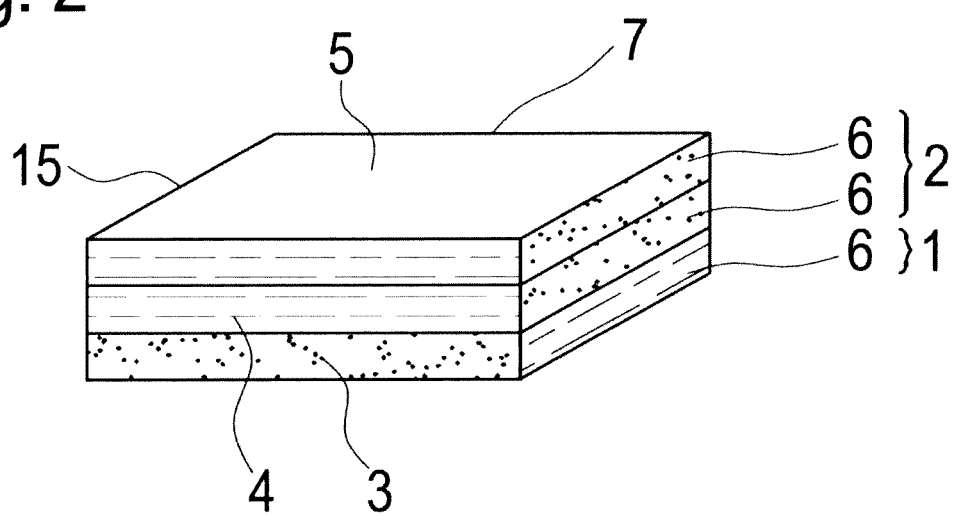
FIG. 2: Schematic representation of an alternative embodiment of a building panel according to the invention.

FIG. 2 depicts a panel with two sections 1 and 2, wherein section 1 comprises one layer 6 and section 2 comprises two layers 6. To achieve a greater overall thickness of the panel two layers with fibers in the same orientation make up the second section 2 and only one layer 6 makes up the first section 1. All three layers 6 can be joined by pressure, such that sections 1 and 2 can be joined in transverse direction as can be seen by the orientation of the fibers 3,4.

Figure 3:
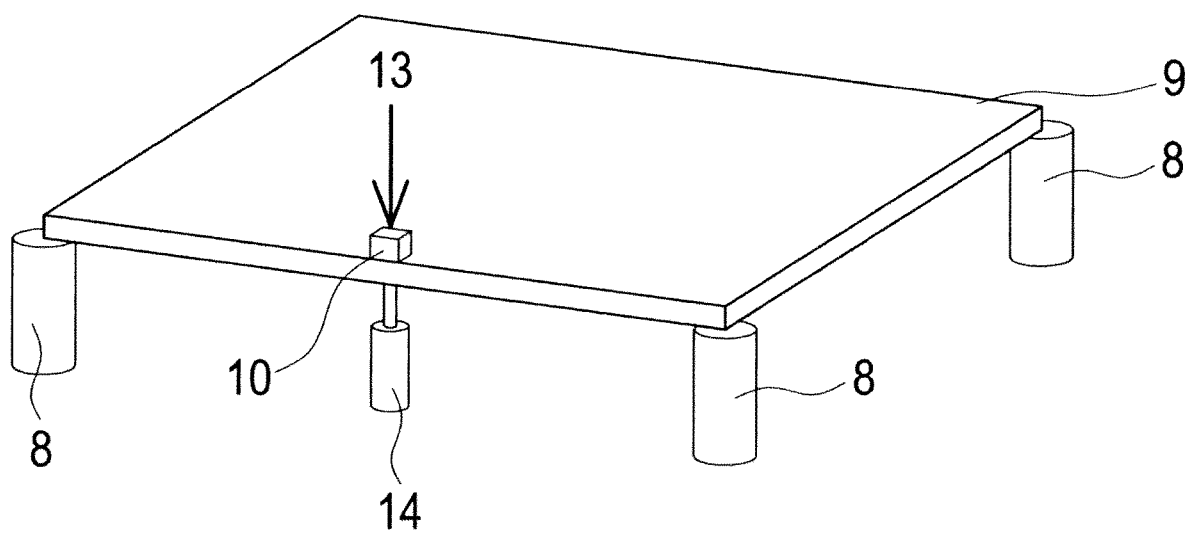
FIG. 3: Schematic representation of the set-up to test the load bearing capacity i.e. the failure load of a panel according to EN 12825 (2001).

FIG. 3 and FIG. 4 depict the main aspects of the test set-ups for the measurements according to 12825 (2001) and EN 15283-2 (2009).

The test set-up for the load-bearing capacity is pictured in FIG. 3. The specimen 9, typically sized 600 mm×600 mm, are placed on four steel cylinders 8 of equal height (90 mm diameter) instead of the usual pedestals. The four corners of a specimen 9 each cover a quarter of the circular surface of the cylinder. The indentor 10, a steel cube 25 mm×25 mm×25 mm, is pushed down on the specimen with a steadily increasing compressive force 13. The deflection sensor 14 measures the deflection or deformation of the specimen with increasing force until the panel cracks and the failure load is determined.

The test set-up for determining the flexural strength is pictured in FIG. 4. Specimen, typically sized 550 mm×300 mm for a building panel thickness of more than 20 mm, are cut from a building panel in longitudinal and in transverse direction. A specimen 9 is placed on parallel supports 11. A platen 12 is pushed down on the center of the specimen with a compressive force 13. The deflection sensor 14 measures the deflection or deformation of the specimen with increasing force until the panel breaks and the failure load is determined. The flexural strength is then determined as described in EN 15283-2 (2009). For the degree of isotropy the flexural strength of a specimen cut in longitudinal direction is related to the flexural strength of a specimen cut in transverse direction.

The examples are intended to further describe the present invention.

The samples were tested according to EN 12825 (2001), EN 15283-2 (2009), FIG. 3 and FIG. 4. The failure load was tested on 600 mm×600 mm panels using steel cylinders instead of pedestals. Thus, the failure load for the load bearing capacity was determined substantially according to EN 12825 (2001). It is believed that this modification does not have an impact on the test results. All tests were conducted on gypsum fiberboard. The results for different relative thicknesses are summarized in Tables 2 and 3. From these results it appears that the degree of isotropy both with regard to the load bearing capacity and the flexural strength increases with decreasing thickness of the first section. However, it is expected that the degree of isotropy will decrease, if the first section is too thin.

The degree of isotropy with regard to the load bearing capacity appears to be one directional, which means that the first section has to be the bottommost section in the test according to EN 12825 (2001), ideally also in the installed panel. The optimum ratio of the thickness of the first section to the thickness of the thin section appears to be close to the 84%/16% ratio. Test results also indicate that if the section makes up approximately 16% of the thickness of the panel, the weak and strong edge are reversed compared to all other examples. So far it is unclear, if this is due to experimental error or that the optimum ratio was surpassed slightly.

Unexpectedly, the degree of isotropy with regard to the flexural strength improved regardless of the configuration of the panel i.e. whether the first section was the bottom or top section in the test. It is expected that the degree of isotropy in flexural strength will also increase regardless of the configuration, for the 68%/32% and 84%/16% panels.

TABLE 1

Average failure load [N] for different panel thicknesses of gypsum fiberboard determined according to EN 12825 (2001). All panels have two equally thick sections that are joined in transverse direction (50%/50%); fibers of the bottom section are oriented substantially parallel to the A and C edges in FIG. 1; sample size in brackets. To guarantee identical measuring conditions, the building panels were tested on their production day.

| | Average failure load [N] (sample size) | | |
| --- | --- | --- | --- |
| Total panel thickness (mm) | Sampling point in the center of edge 7 | Sampling point in the center edge 15 | Degree of Isotropy |
| 28 | 4222 (347) | 5707 (66) | 0.74 |
| 30 | 4720 (685) | 6387 (127) | 0.74 |
| 34 | 6250 (738) | 8274 (104) | 0.75 |
| 36 | 6744 (879) | 9013 (130) | 0.74 |

TABLE 2

Average failure load [N] determined according to EN 12825 (2001) for different proportions of gypsum fiberboard sections joined in transverse direction; fibers of the bottom section are oriented substantially parallel to the edges 7 as depicted in FIG. 1; sample size = 10; panel thickness = 30.0 mm; panels were tested seven days after production.

| Relative thickness of the top section to the section layer in a building panel | Average failure load [N] | | Degree of Isotropy |
| --- | --- | --- | --- |
| | Sampling point in the center of edge 7 | Sampling point in the center edge 15 | |
| 68%/32% | 5258 | 6217 | 0.846 |
| 79%/21% | 5369 | 6011 | 0.893 |
| 84%/16% | 5539 | 5452 | 0.984 |

TABLE 3

Average flexural strength [N/mm$^2$] determined according to EN 15283-2 (2009) for different proportions gypsum fiberboard sections joined in transverse direction; sample size = 10; panel thickness = 30.0 mm; T = bottom section transverse to machine direction and parallel to the platen, P = bottom section in machine direction and perpendicular to the platen, SD = standard deviation.

| Relative thickness of the top section to the bottom section in a building panel | Flexural strength [N/mm$^2$] ± SD | Degree of isotropy |
| --- | --- | --- |
| 50%/50% T | 13.10 ± 0.5 | 0.81 |
| 50%/50% P | 16.10 ± 0.4 | |
| 79%/21% T | 13.74 ± 0.5 | 0.90 |
| 79%/21% P | 15.32 ± 0.5 | |
| 21%/79% T | 13.51 ± 0.3 | 0.89 |
| 21%/79% P | 15.19 ± 0.3 | |

Descriptions of terms of degree such as "approximately" or "about" as used herein should be understood as a reasonable amount of deviation of the term of degree such that the result is not significantly changed. These terms of degree should be construed as including a deviation of at least ±5% or at least ±10%.

As used herein, the term "substantially" and "predominantly" are intended to be understood as sufficient for the effect or to obtain the same overall result as if absoluteness were present. However, both terms may include a deviation of up to 40%, preferably up to 20%, more preferably up to 10%, most preferably up to 2%.

The degrees of isotropy according to the invention may include a tolerance of ±0.02.

The invention claimed is:
1. A building panel comprising:
   a first section and a second section, each section including at least one layer, each of the at least one layer comprising fibers mixed within a binding material;
   the fibers are distributed substantially homogeneously throughout each layer, substantially parallel to the main surfaces of the panel and oriented predominantly in the same direction;
   the first and second sections are firmly joined in transverse direction;
   the first section is thinner than the second section;
   the first section makes up at least 5% of the thickness of the panel and at most 30% of the thickness of the panel;
   the building panel has a fiber content of 5% to 25% by weight;

the building panel comprises at least 50% by weight cementitious material, and the building panel has a degree of isotropy greater than or equal to 0.83 with regard to its load bearing capacity when determining the failure load according to EN 12825 (2001) with the first section beneath the second section.

2. The building panel according to claim 1, wherein the building panel is used in a floor.

3. The building panel according to claim 1, wherein the first section makes up at least 10% of the thickness of the panel and at most 18% of the thickness of the panel.

4. The building panel according to claim 1, wherein the second section has a 2.5 to 10 times greater thickness compared to the first section.

5. The building panel according to claim 1, wherein the at least one layer comprises a plurality of lamina comprising fibers in the same orientation.

6. The building panel according to claim 1, wherein the building panel is a gypsum fiberboard or a cement fiberboard and wherein the building panel has a monolithic appearance.

7. The building panel according to claim 1, wherein the fibers are of: mineral origin, synthetic origin, biological origin, or a combination thereof.

8. The building panel according to claim 1, wherein:
the fibers have a mean length of 1 mm to 5 mm;
the fibers have a mean diameter of 15 µm to 50 µm; or both.

9. The building panel according to claim 1, wherein the building panel has a degree of isotropy greater than or equal to 0.88 with regard to the flexural strength when determining the flexural strength according to EN 15283-2 (2009).

10. The building panel according to claim 1, wherein the building panel has a density greater than 1200 kg/m3 and less than 2000 kg/m3.

11. The building panel according to claim 1, wherein at least one of:
the first section and the second section are joined by pressure before the binding material has set; or
the first section and the second section are joined without the use of an adhesive.

12. The building panel according to claim 1, wherein the fibers are in the form of pulp which is prepared from recycled paper, cardboard, or a combination of paper and cardboard, and wherein the fibers comprise approximately 80% cellulose.

13. A building panel comprising:
a first section and a second section, each section including at least one layer, each of the at least one layer comprising fibers mixed within a binding material;

the fibers are distributed substantially homogeneously throughout each layer, substantially parallel to the main surfaces of the panel and oriented predominantly in the same direction;

the first and second sections are firmly joined in transverse direction;

the first section is thinner than the second section;

the first section makes up at least 5% of the thickness of the panel and at most 30% of the thickness of the panel;

the second section includes at least two layers oriented in the same direction relative to the orientation of the at least one layer of the first section;

the building panel comprises at least 50% by weight cementitious material; and the building panel has a degree of isotropy greater than or equal to 0.83 with regard to its load bearing capacity when determining the failure load according to EN 12825 (2001) with the first section beneath the second section.

14. A building panel comprising:
a first section, a second section, and a third section, each section including at least one layer, each of the at least one layer comprising fibers mixed within a binding material;

the fibers are distributed substantially homogeneously throughout each layer, substantially parallel to the main surfaces of the panel and oriented predominantly in the same direction;

the first and second sections are firmly joined in transverse direction, and the second and third sections are firmly joined in transverse direction;

the first section is thinner than the second section;

the first section makes up at least 5% of the thickness of the panel and at most 30% of the thickness of the panel; and the building panel comprises at least 50% by weight cementitious material; and the building panel has a degree of isotropy greater than or equal to 0.88 with regard to the flexural strength when determining the flexural strength according to EN 15283-2 (2009).

15. The building panel according to claim 14, wherein the building panel has a degree of isotropy greater than or equal to 0.83 with regard to its load bearing capacity when determining the failure load according to EN 12825 (2001) with the first section beneath the second section.

* * * * *